(12) United States Patent
Fujie et al.

(10) Patent No.: US 8,318,633 B2
(45) Date of Patent: Nov. 27, 2012

(54) CATALYST FOR CATALYTIC PARTIAL OXIDATION OF HYDROCARBON AND PROCESS FOR PRODUCING SYNTHESIS GAS

(75) Inventors: Hirokazu Fujie, Ibaraki (JP); Yoshiyuki Watanabe, Yokohama (JP)

(73) Assignees: JGC Corporation, Tokyo (JP); Osaka Gas Co., Ltd., Osaka (JP)

(*) Notice: Subject to any disclaimer, the term of this patent is extended or adjusted under 35 U.S.C. 154(b) by 87 days.

(21) Appl. No.: 12/733,368

(22) PCT Filed: Jun. 18, 2009

(86) PCT No.: PCT/JP2009/002784
§ 371 (c)(1),
(2), (4) Date: Feb. 25, 2010

(87) PCT Pub. No.: WO2010/001539
PCT Pub. Date: Jan. 7, 2010

(65) Prior Publication Data
US 2010/0207069 A1    Aug. 19, 2010

(30) Foreign Application Priority Data
Jul. 4, 2008    (JP) .................................. 2008-176373

(51) Int. Cl.
*B01J 23/00* (2006.01)
*B01J 23/08* (2006.01)
*B01J 23/10* (2006.01)
(52) U.S. Cl. ......... 502/349; 502/355; 502/302; 502/304
(58) Field of Classification Search .......... 502/300–355; 423/245.1, 651; 252/373
See application file for complete search history.

(56) References Cited

U.S. PATENT DOCUMENTS
4,873,217 A    10/1989    Kawajiri et al.
(Continued)

FOREIGN PATENT DOCUMENTS
JP    63-200839    8/1988
(Continued)

OTHER PUBLICATIONS

Youn et al., "Hydrogen Production by auto-thermal reforming of ethanol over nickel catalyst supported on mesoporous yttria-stabilized zirconia" Int. Journal of Hydrogen Energy 34 (2009) 5390-5397. Published online Jun. 6, 2009.*

*Primary Examiner* — Stanley Silverman
*Assistant Examiner* — Anthony J Zimmer
(74) *Attorney, Agent, or Firm* — Jordan and Hamburg LLP (57) ABSTRACT

A catalyst for catalytic partial oxidation of hydrocarbon, having high thermal shock resistance, and a process for producing a synthesis gas using the catalyst are provided. A catalyst for catalytic partial oxidation of hydrocarbon is used in producing a synthesis gas containing carbon monoxide and hydrogen by adding oxygen and steam to a raw material hydrocarbon, thereby subjecting the raw material hydrocarbon to catalytic partial oxidation, and comprises a carrier comprising an inorganic oxide and an active metal supported thereon. In the catalyst, the total of volume of pores having a pore diameter in a first range of from 0.1 μm to less than 1.0 μm is 32% or more of the whole pore volume, and the total of volume of pores having a pore diameter in a second range of from 1.0 μm to 10 μm or less is 14% or more of the whole pore volume.

13 Claims, 6 Drawing Sheets

U.S. PATENT DOCUMENTS

| | | | | |
|---|---|---|---|---|
| 5,134,109 | A | * 7/1992 | Uchiyama et al. | 502/324 |
| 5,187,140 | A | * 2/1993 | Thorsteinson et al. | 502/348 |
| 5,322,829 | A | * 6/1994 | Artes et al. | 502/315 |
| 5,639,401 | A | 6/1997 | Jacobs et al. | |
| 5,752,995 | A | * 5/1998 | Kang | 48/198.7 |
| 7,148,179 | B2 | * 12/2006 | Lansink Rotgerink et al. | 502/208 |
| 7,560,577 | B2 | * 7/2009 | Hirota et al. | 549/534 |
| 2003/0180215 | A1 | * 9/2003 | Niu et al. | 423/651 |
| 2005/0065371 | A1 | * 3/2005 | Petzoldt et al. | 562/546 |
| 2005/0277367 | A1 | * 12/2005 | Fang et al. | 451/41 |
| 2007/0203348 | A1 | * 8/2007 | Bolk et al. | 549/533 |
| 2007/0213545 | A1 | * 9/2007 | Bolk et al. | 549/536 |
| 2008/0081920 | A1 | * 4/2008 | Gueckel | 549/533 |
| 2008/0091038 | A1 | 4/2008 | Hirota et al. | |
| 2008/0224097 | A1 | 9/2008 | Fujie et al. | |
| 2009/0198076 | A1 | * 8/2009 | Guckel | 549/536 |

FOREIGN PATENT DOCUMENTS

| | | |
|---|---|---|
| JP | 63-315148 | 12/1988 |
| JP | 5-208134 | 8/1993 |
| JP | 2004-298971 | 10/2004 |
| JP | 2007-069151 | 3/2007 |
| JP | 4020428 | 12/2007 |
| JP | 2008-086877 | 4/2008 |
| WO | WO-96/04200 | 2/1996 |

* cited by examiner

CATALYST FOR CATALYTIC PARTIAL OXIDATION OF HYDROCARBON AND PROCESS FOR PRODUCING SYNTHESIS GAS

BACKGROUND OF THE INVENTION

The present invention relates to a catalyst used when producing a synthesis gas containing carbon monoxide and, hydrogen becoming a raw material gas of GTL, DME, methanol, ammonia, hydrogen production and the like by conducting partial oxidation by adding oxygen to a light hydrocarbon such as a natural gas containing methane and hydrocarbon having 2 or more carbon atoms, and the associated gases, and a process for producing a synthesis gas.

From the fact that global environmental problems due to mass consumption of fossil fuels such as oils and coals and depletion problems of oil resources in future are recently taken up, GTL (hydrocarbon liquid fuel) and DME (dimethyl ether) that are clean fuels produced from a natural gas and the like are noted. A raw material gas that produces GTL and DME is called a synthesis gas, and contains carbon monoxide and hydrogen.

A steam reforming (SMR) that reforms a natural gas or the like with steam, a partial oxidation (PDX) using oxygen in the absence of a catalyst, or an autothermal reforming (ATR) in which oxidation reaction using oxygen burner and a steam reforming reaction are conducted in the same reactor is conventionally known as a method of producing the synthesis gas. The applicant of the present application develops new process for producing a synthesis gas employing a catalytic partial oxidation (CPO) in which apparatus constitution is simple as compared with the conventional methods and the problems of generation of soot and carbon deposition during reaction are reduced.

The CPO is a method for obtaining a synthesis gas by contacting a hydrocarbon gas separated from a natural gas or the like with an oxygen-containing gas in the presence of a catalyst to partially oxidize the hydrocarbon gas (Patent Document 1). The CPO is excellent as compared with the autothermal reforming in that because a burner is not used, a pre-reformer is not required even though components of C2 or more higher are contained. Furthermore, the CPO has the advantage that because the rate of reaction is extremely large, a reaction is completed even under high GHSV hydrocarbons condition of several ten thousands to several millions, and as a result, a size of a reactor is decreased.

For example, in the case of methane, the reaction mainly includes the following reactions.

| | | |
|---|---|---|
| (1) | $CH_4 + 1/2 O_2 \rightarrow 2H_2 + CO$ | $\Delta H298 = -36$ kJ/mol |
| (2) | $CH_4 + 2O_2 \rightarrow CO_2 + 2H_2O$ | $\Delta H298 = -879$ kJ/mol |
| (3) | $CO + H_2O \rightarrow CO_2 + H_2$ | $\Delta H298 = -42$ kJ/mol |
| (4) | $CH_4 + H_2O \rightarrow CO + 3H_2$ | $\Delta H298 = +206$ kJ/mol |
| (5) | $CH_4 + CO_2 \rightarrow 2CO + 2H_2$ | $\Delta H298 = +248$ kJ/mol |

Figure 8:
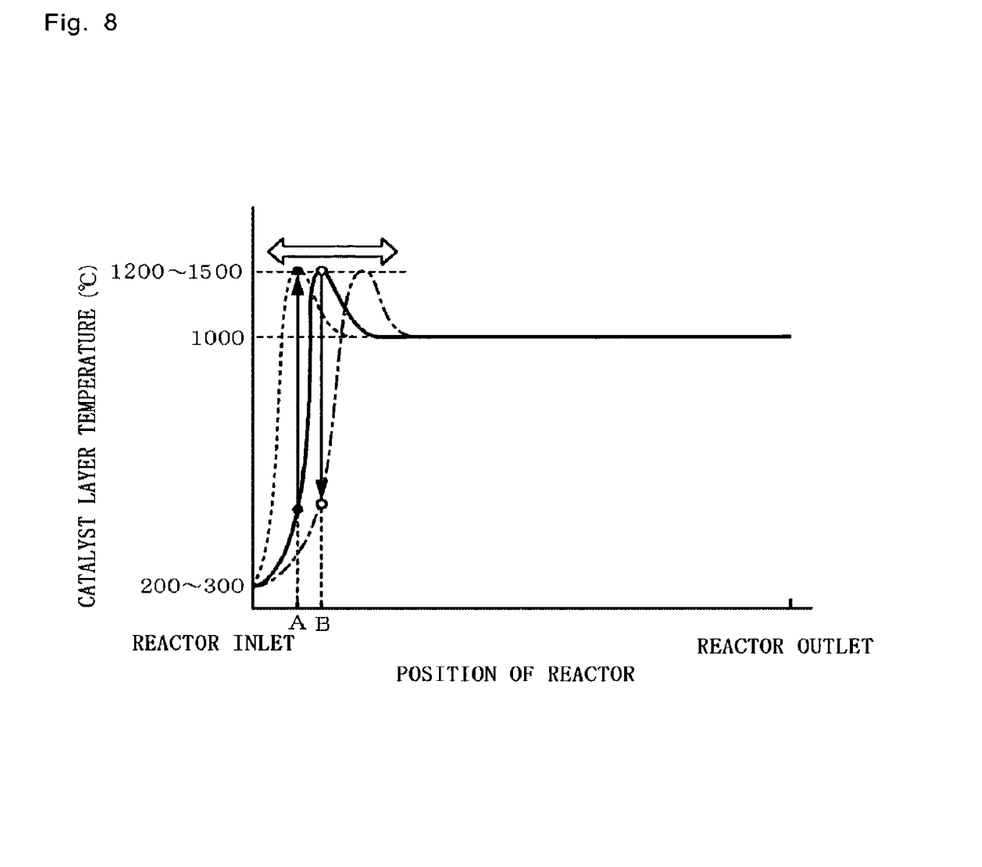
FIG. 8 is a characteristic view showing the relationship between the position in a gas flow direction in a reactor and the temperature of a catalyst layer.

The reactions (1) to (5) proceed in combination or sequentially, and a gas composition at an outlet is governed by the equilibrium. However, those reactions are very large exothermic reaction as the whole reaction. Of those reactions, reaction rate of the reactions (1) and (2) is extremely large, and particularly, reaction heat of complete oxidation of (2) is large. As a result, temperature is rapidly increased at an inlet of a catalyst bed. The solid line shown in FIG. 8 is temperature distribution in which a horizontal axis shows the position of from an inlet side to an outlet side of a reactor and a vertical axis shows temperature of a catalyst bed. For example, when a feed gas is supplied at a temperature of about 200 to 300° C., the feed gas is affected by the exothermic reaction, and the temperature of an inlet part of a catalyst bed is rapidly increased to, for example, about 1,200 to 1,500° C. Then, by the influence of endothermic reaction, for example, (4) and (5), in which the reaction rate is relatively small, the temperature of the catalyst bed is gradually decreased, and it then reaches a condition of thermal equilibrium at about 1,000° C.

The temperature distribution of a catalyst bed rapidly varies depending on, for example, change in composition of a feed gas and very small change in pressure, and the position at which the temperature of a catalyst bed is maximum shifts to an upstream side or a downstream side of a reaction according to those changes as shown by, for example, a broken line or an alternate long and shot dash line in FIG. 8. For example, in the case that the temperature distribution in the reactor is changed from the state shown by the solid line to the state shown by the broken line in FIG. 8, a catalyst charged at the position shown by point A on the horizontal axis is rapidly heated to about 1,200 to 1,500° C. The temperature change occurs in, for example, from less than 1 second to several seconds. Therefore, the catalyst in this region is exposed to rapid temperature change of, for example, about 250° C./second to 1,300° C./second. On the other hand, in the case that the temperature distribution shown by the solid line is changed to the temperature distribution shown by the alternate long and short dash line, the catalyst charged at the position of, for example, point B is cooled and rapidly exposed to temperature change to the same extent as the point A.

The change of temperature distribution in the catalyst bed is intermittently generated during operation of the reactor. Therefore, the catalyst charged in the vicinity of the inlet of the reactor always repeatedly undergoes the rapid heating and cooling. The catalyst charged in the reactor is formed into a Sphere, a tablet, a Cylinder, a honeycomb, a monolith, a ring, guaze, a foam or the like. As a result, the catalyst undergoes stress change by rapid expansion and contraction posed by the heating and cooling, that is, thermal impact, and as a result, is destroyed and powdered, resulting in clogging of the catalyst bed. Where the catalyst layer causes clogging, pressure drop of the reactor is increased, and there is a possibility that the operation cannot be continued. For this reason, the catalyst used in the CPO is required to have high thermal shock resistance.

Patent Document 2 describes a catalyst for use in the CPO, having improved thermal shock resistance by supporting an active metal on a carrier comprising zirconia as a main component. However, the catalyst applies temperature change of 60 to 100° C./second over a temperature range of from 800 to 1,200° C. to the application range. This temperature change is very mild condition as compared with the above-described temperature change, and is not suitable to the CPO process developed by the present applicant.

Patent Document 1 JP-A 2007-69151: paragraphs 0038 to 0042.

Patent Document 2 Japanese Patent No. 4020428: Claim 1, paragraph 0027.

SUMMARY OF THE INVENTION

The present invention has been made under the above circumstances, and its object is to provide a catalyst for catalytic partial oxidation of hydrocarbon, having high thermal shock resistance, and a process for producing a synthesis gas using the catalyst.

The catalyst for catalytic partial oxidation of hydrocarbon according to the present invention is a catalyst for catalytic partial oxidation of hydrocarbon, which comprises a carrier comprising an inorganic oxide and an active metal supported thereon, the catalyst being used in producing a synthesis gas containing carbon monoxide and hydrogen by adding at least oxygen and steam to a raw material hydrocarbon containing at least one of methane and a light hydrocarbon having 2 or more carbon atoms, thereby subjecting the raw material hydrocarbon to catalytic partial oxidation, wherein:

the total of volume of pores having a pore diameter in a first range of from 0.1 μm to less than 1.0 μm in a pore distribution of the catalyst is 32% or more of the whole pore volume, and the total of volume of pores having a pore diameter in a second range of from 1.0 μm to less than 10 μm in the pore distribution is 14% or more of the whole pore volume.

The catalyst is preferably that a pore distribution curve of pore diameters in the first range and a pore distribution curve of pore diameters in the second range are continued, a specific surface area of the catalyst is from 0.5 m²/g to 7.0 m²/g, and the whole pore volume is from 0.05 cm³/g to 0.3 cm³/g. Furthermore, a first constituent element of the carrier comprising an inorganic oxide is Al, the carrier contains Al in an amount of from 30% to 90% by weight in terms of $Al_2O_3$, and the carrier comprising an inorganic oxide further contains oxides of at least two elements selected from the group consisting of elements belonging to alkaline earth metals, elements belonging to rare earth metals, and elements comprising Sc, Bi, Zr, Si and Ti, in addition to the first constituent element. The case is preferred that the elements belonging to the alkaline earth metals are Mg, Ca, Sr and Ba, and the elements belonging to the rare earth metals are Y, La, Ce, Pr, Nd, Sm, Eu, Gd, Tb, Dy, Ho, Er and Yb. In this case, the carrier comprising the inorganic oxide preferably contains zirconia stabilized by at least one element selected from Y, Ce, Ca, Mg, Sc and Sm, such as yttria-stabilized zirconia. In the case that the stabilized zirconia is yttria-stabilized zirconia, the yttria contains in a range of from 2 mol % to 10 mol %.

The active metal is at least one metal selected from elements of Group VIII of the periodic table, such as Ru, Pt, Rh, Pd, Os and Ir. The active metal is contained in an amount of from 0.05% to 5.0% by weight per unit weight of the catalyst.

A process for producing a synthesis gas according to other invention comprises:

a step of supplying a feed gas to a reactor, the feed gas comprising a raw material hydrocarbon containing at least one of methane and a light hydrocarbon having 2 or more carbon atoms, and oxygen and steam added thereto, and the raw material gas containing hydrogen which is hydrogen contained in the raw material hydrocarbon and/or is hydrogen added, and a step of contacting the raw material gas with a catalyst provided in the reactor in a heated state to catalytically partially oxidize the raw material hydrocarbon, thereby producing a synthesis gas containing carbon monoxide and hydrogen.

In the step of producing a synthesis gas, it is preferred that the region at which the catalyst and the raw material gas are contacted in a heated state contains a region at which the catalyst undergoes temperature change of 250° C./second to 1,300° C./second over a temperature range of 200° C. to 1,500° C. It is preferred that the feed gas is pre-heated to 200° C. to 500° C., supplied to the reactor under the conditions that pressure is atmospheric pressure to 8 MPa and gas hourly space velocity (GHSV) is $5.0 \times 10^3$ (NL/L/Hr) to $1.0 \times 10^6$ (NL/L/Hr), and then contacted with the catalyst under adiabatic reaction conditions.

According to the present invention, a catalyst for catalytic partial oxidation of a hydrocarbon, which is difficult to be destroyed and powdered even though receiving thermal shock can be obtained by using a catalyst having high thermal shock resistance to temperature change, in which the volume of pores having a pore diameter in a first range of from 0.1 μm to 1.0 μm is 32% or more to the whole pore volume, and the volume of pores having a pore diameter in a second range of from 1.0 μm to 10 μm is 14% or more to the whole pore volume. This can provide a process in which troubles such as clogging of a catalyst layer due to destruction and powdering of a catalyst are difficult to be generated even though the catalyst is charged in a region which repeatedly receives thermal shock during operation, such as inlet of a reactor in CPO process, and therefore, reliability is high.

DESCRIPTION OF REFERENCE NUMERALS

| | |
|---|---|
| 4 | Reactor |
| 5 | Catalyst bed |
| 41 | Inlet |
| 42 | Outlet |

DESCRIPTION OF THE PREFERRED EMBODIMENTS (First Embodiment)

In a catalyst according to a first embodiment of the present invention, a carrier which is an inorganic oxide is produced by, for example, a method of providing a powder of an alumina precursor such as boehmite, pseudoboehmite or aluminum hydroxide, or an alumina powder such as γ,η,χ or α-alumina, mixing the powder with a powder of a salt (such as nitrate) of barium, or an organic acid salt such as barium acetate, or its aqueous solution, a powder of YSZ, and if necessary, a binder as a molding aid, and adding water to the resulting mixture to adjust the water content. After appropriately adjusting the water content, the mixture is molded by extrusion molding, tablet molding, press molding, pressure molding or the like, thereby forming a molded article of Cylinder, tablet shape, honeycomb, ring or the like.

The molded articles obtained are dried by heating, if necessary, and then calcined in a firing furnace at, for example, 900° C. to 1,800° C. for, for example, 24 hours. Thus, an inorganic oxide carrier containing barium oxide, such as a composite oxide comprising alumina as a main component, and BaO and YSZ as accessory components, a part being Ba and Al (for example, $BaAl_2O_4$ or barium hexyluminate ($BaAl_{11}O_{19}$) as a spinel component), or an composite oxide of Ba and Zr (for example, $BaZrO_3$) is obtained. The aluminum content in the carrier is preferably 30% to 90% by weight, more preferably 40% to 80% by weight, and further preferably 50% to 80% by weight, in terms of alumina. The barium content is preferably 5% to 30% by weight, and further preferably 5% to 20% by weight, in terms of BaO. The YSZ content is preferably 5% to 40% by weight, and further preferably 10% to 30% by weight, in terms of the weight of YSZ containing yttria ($Y_2O_3$) in a range of 2 mol % to 10 mol %.

The method of adding the accessory components (Ba and YSZ) to alumina is not limited to the above-described methods, and various preparation methods generally well known, such as the conventional impregnation method, precipitation method and sol-gel method, may be used according to the proportion of the accessory components added. Furthermore, components other than Al, contained in the carrier are not limited to those. The carrier may contain elements belonging to alkaline earth metals such as Mg, Ca, Sr and Ba, elements belonging to rare earth metals such as Y, La, Ce, Pr, Nd, Sm, Eu, Gd, Tb, Dy, Ho, Er and Yb, oxides of at least two elements selected from the group consisting of Sc, Bi, Zr, Si and Ti, and stabilized zirconia other than YSZ. The carrier may further contain elements that are not included in those elements.

Figure 2:
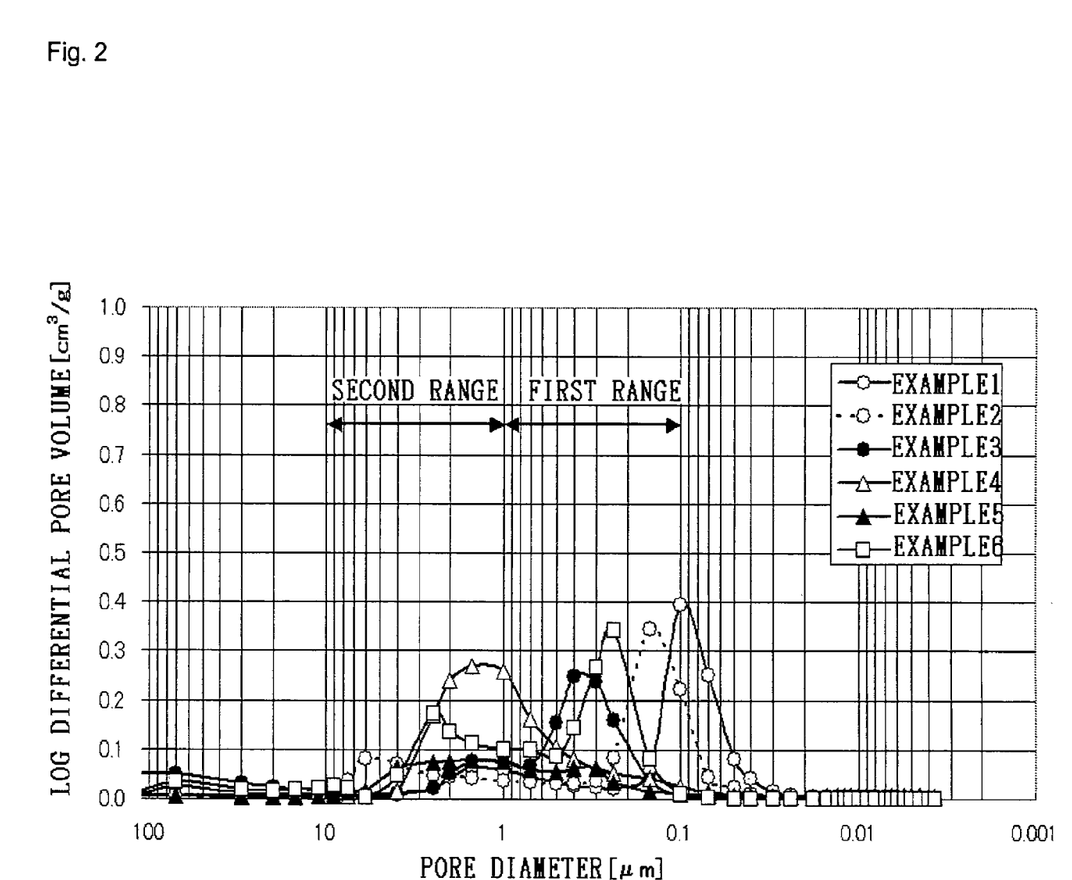
FIG. 2 is an explanatory view showing log differential pore volume distribution curves of the carriers according to the Examples.

The carrier prepared by the method described above contains pores having a pore diameter of from 0.1 μm to 1.0 μm (hereinafter referred to as a "first range") that the conventionally used alumina type carrier has, and in addition to this, a relatively large amount of pores having a pore diameter of from 1.0 μm to 10 μm (hereinafter referred to as a "second range"). As shown in the experimental results by the Examples described hereinafter, it is confirmed that a carrier having high thermal shock resistance is obtained in the case that the total of volume of pores having a pore diameter in the first range is 32% or more of the whole pore volume, and the total of volume of pores having a pore diameter in the second range is 14% or more of the whole pore volume. Furthermore, in the case that the pore distribution of the first range and the pore distribution of the second range are shown by, for example, log differential pore volume distraction curve, it is preferred that those two distribution curves are continued. Furthermore, the specific surface area of the carrier is a range of from 0.5 $m^2/g$ to 7.0 $m^2/g$, and the whole pore volume is a range of from 0.05 $cm^3/g$ to 0.3 $cm^3/g$. The term "two pore distribution curves are continued" means that in the case that the pore distribution of the carrier is shown by, for example, log differential pore volume distribution curve, the region in which the log differential pore volume is 0 ($cm^3/g$) is not present in the course of the distribution curve continuing from the first range to the second range. The log differential pore volume is preferably that at least about 0.02 ($cm^3/g$) is present as in the plot at 0.24 (μm) of the carrier according to Example 1 as shown in FIG. 2 described hereinafter. The pore volume and pore diameter of the carrier have the correspondence relationship, and the log differential pore volume distribution curve is a curve indicating pore distribution of pore diameter of the carrier.

To obtain a catalyst having high thermal shock resistance, the carrier is simply satisfied with the above-described requirements at the stage of the carrier before supporting an active metal thereon. However, the active metal supported on the catalyst is merely about 0.05% to 5.0% by weight based on the total catalyst weight as described hereinafter, those index values do not greatly change even after supporting the active metal, and it is not realistic to remove the active metal once supported and measure those index values. From those facts, the catalyst satisfying the above each index value even though a catalyst after supporting the active catalyst is said to be provided with high thermal shock resistance. Regarding the fact that the above each index value does not almost change before and after supporting the active metal in an amount of about 0.05% to 5.0% by weight based on the total catalyst weight, the present inventors have confirmed by the experiments.

From the above, it says that the catalyst satisfying the following requirements is provided with high thermal shock resistance. In the catalyst after supporting the active metal, the catalyst is satisfied with at least that the total of the volume of pores having a pore diameter in the first range is 32% or more of the whole pore volume, and the total of the volume of pores having a pore diameter in the second range is 14% or more of the whole pore volume; in the case that the pore distribution of the first range and the pore distribution of the second range in the catalyst are indicated by, for example, log differential pore volume distribution curves, those distribution curves are continued; and the catalyst has a specific surface area in a range of from 0.5 $m^2/g$ to 7.0 $m^2/g$, and a whole pore volume in a range of from 0.05 $cm^3/g$ to 0.3 $cm^3/g$.

The preparation method of the carrier having those characteristics is specified by, for example, preparing various carriers by combining the above-described preparation methods by preliminary experiments, measuring pore volume distribution by mercury intrusion technique using mercury porosimetry or the like, and screening carriers satisfying the above-described requirements from each preparation method. A preparation method of a carrier having the highest thermal shock resistance and a preparation method having inexpensive cost are selected from the carriers remained as a result of screening, and the carrier having high thermal shock resistance is produced in an industrial scale by the preparation method selected. In the pore distribution measurement by mercury intrusion porosimetry, the pore volume of pores having a diameter in a range of from 0.003 μm to 500 μm and its distribution curve can generally be measured. Pore volume having a diameter smaller than 0.003 μm can be measured by, for example, gas adsorption method, but it is considered that such pores are not almost contained in the carrier according to the present embodiment.

Not only the above-described composition and production process but a molding method is important to produce a carrier having the pore distribution structure having excellent thermal shock resistance. A method of molding under pressure, such as extrusion molding method, tablet molding method or press molding method is preferred. In a method of molding substantially without pressure, such as tumbling granulation method, it may be difficult to obtain a carrier having the pore distribution structure as in the present invention.

A salt of a metal of Group VIII of the periodic table which is an active metal, such as a salt of Ru (ruthenium), Pt (platinum), Rh (rhodium), Pd (palladium), Os (osmium) and Ir (iridium), for example, in the case of Ru, a ruthenium nitrate aqueous solution, is sprayed to the carrier prepared by the above method to impregnate the carrier with the salt. Subsequently, the carried is dried and then calcined in an electric furnace, for example, at 600° C. for 3 hours to obtain the catalyst of the present invention having the element of Group VIII such as ruthenium supported on the carrier. The method for supporting the active metal is not limited to this embodiment, and a method of coating or pore filling a carrier with an aqueous solution or a solution of the element of Group VIII, or a method of selectively adsorbing the solution on a carrier may be employed.

The catalyst generally used in a solid-gas reaction and a solid-liquid reaction has been designed to increase the specific surface area of a catalyst to thereby uniformly disperse an active metal as much as possible on the catalyst surface, by increasing pore volume of 0.1 μm or less, called mesopores or micropores having a pore diameter of from 0.1 μm to 1.0 μm corresponding to the first range, or a pore diameter smaller than this. In contrast, the catalyst according to the present embodiment contains pores having a large pore diameter of from 1.0 μm to 10 μm (the second range) which has not conventionally been noted, in a relatively large proportion of 14% or more of the whole pore volume, and the pore volume of from 0.1 μm to 1.0 μm (the first range) which is a large region of a pore size in the pore diameter with which the conventional catalyst has been provided, is 32% or more of the whole pore volume.

The reason why thermal shock resistance of the catalyst having such a constitution is improved is not clear. However, it is considered that because a porous member generally can relax stress added thereto to a certain extent by, for example, that pores get distorted, and many pores are formed in the catalyst according to the present embodiment, the pores absorb thermal shock applied to a catalyst by, for example, that those pores get distorted. In particular, the catalyst according to the present embodiment is provided with pore distribution containing many pores having a relatively large pore diameter widely continuing from the first range to the second range as shown in the Examples described hereinafter. Therefore, even though the catalyst receives rapid thermal shock over a very wide temperature range of, for example, from 200° C. to 1,300° C., there is the possibility that any pores having various pore diameters present in the catalyst can efficiently absorb stress applied to the catalyst. As a result, stress can flexibly be absorbed as compared with the case that the distribution of pore diameters is concentrated in a specific pore size, and as a result, it is considered that a catalyst which is difficult to be destroyed and powdered is formed. Furthermore, there is the possibility that the first and second ranges of from 0.1 μm to 10 μm constitute a pore diameter range suitable to absorb thermal shock caused by rapid temperature change of from about 200° C. to 300° C. to about 1,200° C. to 1,500° C. Furthermore, in the case that two kinds or more of metal oxides other than alumina are added as a carrier as in the present invention, it is considered that stress due to rapid thermal expansion and thermal contraction is absorbed by compositing oxides having different coefficients of thermal expansion as being different from a single component.

Figure 1:
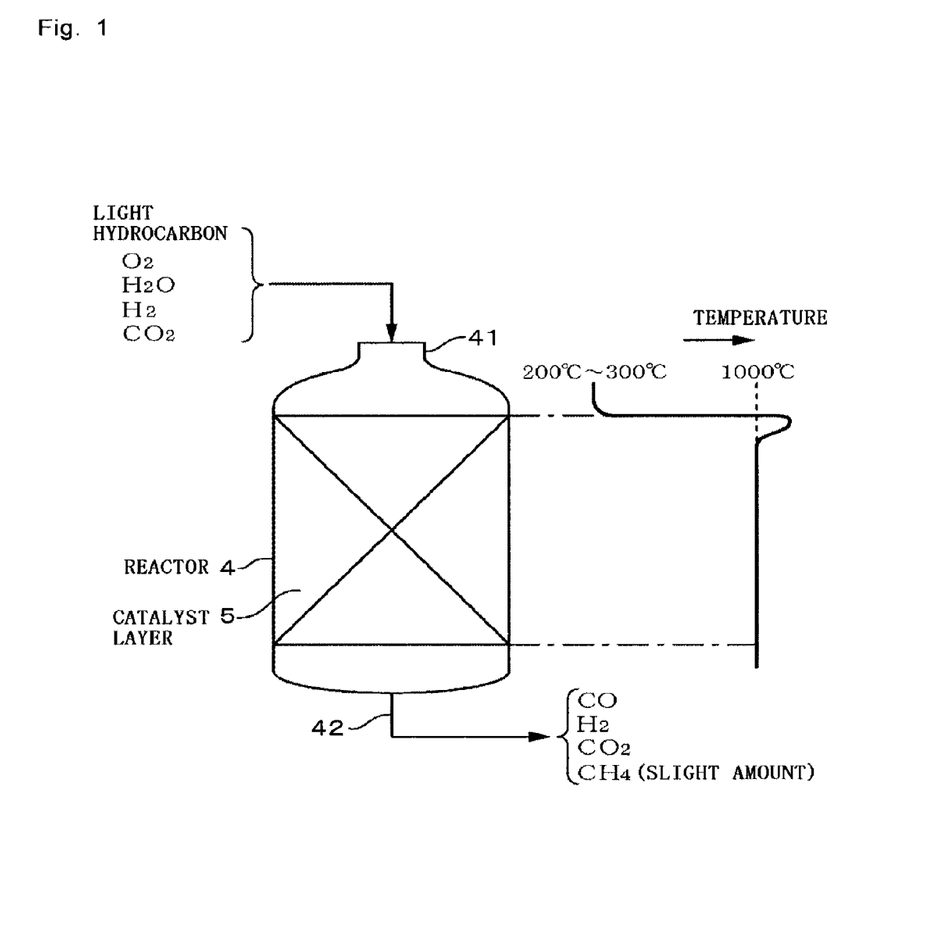
FIG. 1 is a schematic view showing an apparatus used in the process for producing a synthesis gas of the present invention.

FIG. 1 is a view schematically showing an apparatus for producing a synthesis gas using the catalyst of the present invention. 4 is a cylindrical reactor, and the catalyst of the present invention is charged therein to form a catalyst layer 5. In this apparatus, a feed gas obtained by adding oxygen, steam and carbon dioxide to a light hydrocarbon as a raw material is supplied from an inlet 41 at the upper part of the reactor 4, and passed through the catalyst layer 5 to conduct partial oxidation reaction, and a synthesis gas is taken out of an outlet 42 at the lower side of the reactor 4.

For example, in a catalyst using Ru as an active metal, volatile $RuO_4$ is formed at the inlet part of the catalyst layer, and may be scattered during the reaction. For this reason, it is necessary that hydrogen is contained in the raw material gas in a range of from 0.001 to 0.1 as a molar ratio of hydrogen to hydrocarbon (hydrogen/hydrocarbon). However, in the case that the raw material hydrocarbon is treated with a pre-treating desulfurization reactor, where the hydrogen concentration is fallen within this range, it is not necessary to add hydrogen, and the hydrocarbon after desulfurization can directly be supplied. In the case that hydrogen is not contained in the raw material hydrocarbon, hydrogen is added.

Furthermore, as disclosed in Japanese Patent Application No. 2004-298971, the raw material hydrocarbon after desulfurization is subjected to low temperature steam reforming using steam to convert hydrocarbon having 2 or more carbon atoms into methane and hydrogen, and the raw material may be introduced into the reactor 4 to perform catalytic partial oxidation.

In CPO reaction, the gas composition at the outlet is governed by an equilibrium composition determined by inlet temperature, pressure and feed gas composition. Therefore, it is necessary to determine oxygen concentration in the feed gas by the ratio of $H_2$ and CO of the synthesis gas to be required. However, in the case of a synthesis gas for GTL, DME, methanol and ammonia, the oxygen concentration is preferably that (mole number of oxygen/mole number of carbon in hydrocarbon) is from 0.2 to 0.8. Steam is the factor of not only preventing carbon deposition but governing the synthesis gas composition as described above. Therefore, the steam content is preferably that (mole number of steam/mole number of carbon in hydrocarbon) is from 0.2 to 3.0.

In the case of a synthesis gas for GTL, DME and methanol, it is preferred to contain carbon dioxide in the feed gas in order to adjust the ratio between $H_2$ and CO in the synthesis gas to be required. The carbon dioxide content is that (mole number of carbon dioxide/mole number of carbon in hydrocarbon) is preferably from 0.01 to 0.6, and more preferably from 0.1 to 0.3.

The raw material gas is preheated to a range of from 200° C. to 500° C., for example, from 200° C. to 300° C., and supplied to the reactor 4. Pressure at the inlet 41 of the reactor 4 is, for example, ordinary pressure to 8 MPa. Gas hourly space velocity (GHSV) is, for example, from $5.0 \times 10^3$ $hr^{-1}$ to $1.0 \times 10^6$ $hr^{-1}$, and more preferably from $2.0 \times 10^4$ $hr^{-1}$ to $2.0 \times 10^5$ $hr^{-1}$.

When the feed gas is supplied to the reactor 4, oxidation reactions shown by the formula (1) and the formula (2) in the item of Background Art occur by the catalyst, and as explained in FIG. 8, large generation of heat is generated at the inlet of the catalyst layer 5. As a result, the temperature at this site is increased. In the case that the position generating the temperature increase moves to the upstream side and the downstream side of the catalyst layer 5 as explained in Background of Art in the region, the catalyst charged in the moving region is exposed to thermal shock due to rapid temperature change of from the temperature of about 200 to 300° C. to about 1,200 to 1,300° C. However, the catalyst according to the present embodiment is provided with high thermal shock resistance as shown in the Examples described hereinafter. As a result, the catalyst is difficult to be destroyed and powdered even though receiving thermal shock.

The formulae (1) to (5) described before simultaneously proceed and reach the equilibrium composition in the catalyst layer 5 of the downstream side rather than the region in which the temperature is rapidly increased. Therefore, the temperature of the catalyst layer 5 is stabilized to the equilibrium temperature of the outlet gas composition determined by the composition of the feed gas and the reaction pressure, for example, the temperature of about 1,000° C. in the case of the synthesis gas for GTL. In this case, a gas having a composition determined by the equilibrium at 1,000° C., that is, a synthesis gas containing carbon monoxide and hydrogen in the proportion suitable for a synthesis gas for GTL, is obtained at the outlet 42 of the reactor 4.

The synthesis gas contains carbon dioxide. However, carbon dioxide is separated from the synthesis gas in the step of the post-stage, the carbon dioxide separated is added to the feed gas, and the feed gas is supplied to the reactor 4. Thus, carbon dioxide is reused (recycled). The carbon dioxide supplied to the feed gas is not limited to the recycle from CPO process. Carbon dioxide contained in an unreacted gas from Fischer-Tropush reaction process (FT process) which synthesizes GTL using a synthesis gas as a raw material may be recycled. Furthermore, from that the unreacted gas contains CO gas, the unreacted gas may be recycled as a feed gas, and a gas containing light hydrocarbon obtained by purification process of GTL (called FT synthesis offgas) may be recycled as a feed gas In the case of producing the catalyst for catalytic partial oxidation according to the present invention, chlorine is contained in the raw material gas. As a result, where chlorine remains in a certain concentration even after calcination, stress corrosion cracking and corrosion wastage are generated in piping, instruments and the like exposed to the temperature condition of a dew point or lower in the downstream of the reactor. For this reason, it is preferred to use a chlorine-free raw material as the raw material for producing the catalyst for catalytic partial oxidation according to the present invention, or to remove chlorine. Chlorine remained in the catalyst is attributed to a raw material of barium and elements of Group VIII. Therefore, a catalyst free of chlorine can be produced by using a raw material free of chlorine, such as hydroxide, nitrate, carbonate and organic acid salt, as the raw material. In the case of using rhodium chloride, ruthenium chloride or the like as a raw material of the element of Group VIII, a method of removing chlorine in a supporting step may be employed. Regarding the chlorine removal method, chlorine can be removed to 100 ppm or less by the method disclosed in, for example, JP-A 60-190240, but it is possible to remove chlorine by, for example, a method of washing with an alkali aqueous solution.

In the above, the synthesis gas produced using the catalyst of the present invention is not limited to use as a raw material of GTL, methanol, DME, hydrogen and the like, and includes a gas used as a synthesis raw material of ammonia gas. In this case, air or oxygen-rich air is used in place of high purity oxygen from an oxygen plant, and air, oxygen-rich air and steam are added to the raw material hydrocarbon. Thus, a synthesis gas containing hydrogen, nitrogen and carbon monoxide is obtained. This synthesis gas becomes a synthetic raw material of ammonia by removing carbon monoxide and carbon dioxide in a post-step.

According to the present embodiment, there are the following effects. A catalyst for catalytic partial oxidation of hydrocarbon, which is difficult to be destroyed and powdered even though receiving thermal shock can be obtained by using a catalyst having high resistance to thermal shock due to temperature change, in which the volume of pores having a pore diameter in the first range of from 0.1 µm to 1.0 µm is 32% or more to the whole pore volume, the volume of pores having a pore diameter in the second range of from 1.0 µm to 10 µm is from 14% to 62% to the whole pore volume, and a pore distribution of the first range and a pore distribution of the second range are continued. By this, even though the catalyst is charged in the region repeatedly receiving thermal shock during operation, such as the inlet of the reactor 4 of CPO process, troubles such as destruction of a catalyst and clogging of the catalyst layer 5 by powdering are difficult to be generated, thereby achieving a process having high reliability.

The catalyst according to the present embodiment is not limited to the case of charging in the whole of the catalyst layer 5 in the reactor 4. The catalyst according to the present embodiment may be charged in a region to which the position causing the rapid temperature change as described before moves, for example, the upstream side of the catalyst layer 5, and a region of ⅕ to ½ of the whole catalyst layer, and the catalyst produced using the conventional carrier may be charged in the downstream side.

(Second Embodiment)

A catalyst according to a second embodiment comprises alumina as a main component of a carrier, and contains Ca oxide, Si oxide and Mg oxide as accessory components. A method for producing the carrier is the same as the method for producing the carrier according to the first embodiment, but alumina cement, silica sol and magnesium oxide powder were added to the powder of alumina or alumina precursor in place of YSZ. The content of Al in the carrier is preferably from 30% to 90% by weight, more preferably from 40% to 80% by weight, and further preferably from 50% to 80% by weight, in terms of $Al_2O_3$. The content of calcium is preferably from 5% to 30% by weight, and more preferably from 10% to 30% by weight, in terms of CaO. The content of silicon is preferably from 5% to 30% by weight, and more preferably from 10% to 20% by weight, in terms of $SiO_2$. The content of magnesium is preferably from 5% to 30% by weight, and more preferably from 10% to 30% by weight, in terms of MgO. Components contained in the carrier are not limited to those, and elements other than Al, Ca, Si and Mg may be contained.

In the carrier, similar to the case of the first embodiment, the preparation method of the carrier in which the volume of pores having a pore diameter of the first range is 32% or more of the whole pore volume; the volume of pores having a pore diameter of the second range is from 14% to 62% of the whole pore volume; preferably, in the case that pore distribution of the first range and pore distribution of the second range are indicated by, for example, log differential pore volume distribution curves, those two distribution curves are continued; a specific surface area of the carrier is from 0.5 $m^2/g$ to 7.0 $m^2/g$; and a whole pore volume is from 0.05 $cm^3/g$ to 0.3 $cm^3/g$ is selected from carriers prepared by various preparation methods by screening.

The embodiment that ruthenium or the like which is the element of Group VIII is supported as an active metal and applied to CPO process shown in FIG. 1 to produce a synthesis gas is the same as the first embodiment as described above, and the description thereof is omitted.

Thus, the catalyst according to the second embodiment differs from the catalyst according to the first embodiment in the component of the carrier, but it could be confirmed that the catalyst according to the second embodiment is provided with high thermal shock resistance as shown in the Examples described hereinafter.

(Third Embodiment)

A catalyst according to a third embodiment comprises alumina as a main component of a carrier, and contains Mg oxide and YSZ as accessory components. The content of aluminum is preferably from 30% to 90% by weight, more preferably from 40% to 80% by weight, and further preferably from 50% to 80% by weight, in terms of alumina. The content of magnesium is preferably from 5% to 30% by weight, and more preferably from 10% to 30% by weight, in terms of MgO. The content of YSZ is preferably from 5% to 40% by weight, and more preferably from 10% to 30% by weight, in terms of weight of YSZ containing yttria ($Y_2O_3$) in a range of from 2 mol % to 10 mol %. The preparation method of the carrier, the supporting method of the active metal, the adjustment method of the pore diameter such as selection of the preparation method of the carrier by screening, the application to CPO process, and the like are the same as in the first embodiment as described before, and the descriptions of those are omitted. Components contained in the carrier are not limited to those, and the carrier may contain oxides other than $Al_2O_3$, MgO and YSZ.

In the carrier, similar to the case of the first embodiment, the preparation method of the carrier in which the volume of pores having a pore diameter of the first range is 32% or more of the whole pore volume; the volume of pores having a pore diameter of the second range is from 14% to 62% of the whole pore volume; preferably, in the case that pore distribution of the first range and pore distribution of the second range are indicated by, for example, log differential pore volume distribution curves, those two distribution curves are continued; a specific surface area of the carrier is from 0.5 $m^2$/g to 7.0 $m^2$/g; and a whole pore volume is from 0.05 $cm^3$/g to 0.3 $cm^3$/g is selected from carriers prepared by various preparation methods by screening. It could be confirmed that the catalyst according to the third embodiment is provided with high thermal shock resistance as shown in the Examples described hereinafter.

Components of the catalyst for catalytic partial oxidation of hydrocarbon according to the present invention are not limited to the first to third embodiments exemplified above, and it is good that oxides of elements selected from Group IIA, Group IIIA, Group IVA, Group IIB, Group IIIB, Group IVB and lanthanoid in the periodic table, for example, oxides of at least two elements selected from the group consisting of magnesium, silicon, calcium, titanium, barium, yttrium, zirconium, lanthanum and cerium are contained in the elements of inorganic oxides as accessory components, other than Al. As the general index value of the catalyst according to the present embodiments, it is preferred that the whole pore volume is from 0.05 $cm^3$/g to 0.3 $cm^3$/g and the specific surface area is about 0.5 $m^2$/g to 7.0 $m^2$/g.

EXAMPLES

Experiment

Molded articles of carriers satisfying three requirements that (i) the volume of pores having a pore diameter in the first range (0.1 μm to 1.0 μm) is 32% or more to the whole pore volume, (ii) the volume of pores having a pore diameter in the second range (1.0 μm to 10 μm) is 14% or more to the whole pore volume, and (iii) the pore distributions of the two ranges are continued, as described in the first to third embodiments above, and carriers not satisfying those requirements were prepared, respectively. Thermal shock was applied to those molded articles, and generation states of destruction and powdering were confirmed. The test was conducted as follows. 5 to 10 g of the carrier was heated to 1,200° C. in a muffle furnace, and was held therein for 10 minutes. The carrier was taken out of the furnace and immediately introduced into 1 liter of water held at 20° C., thereby applying thermal shock due to rapid cooling with the temperature difference of about 1,200° C. The carrier was taken out of the water, and then again introduced into the muffle furnace. This operation was repeated ten times. Thus, thermal shock test by rapid cooling and rapid heating was conducted. Water has specific heat larger than that of the raw material gas, and evaporative latent heat of water is lost from the carrier by the introduction at high temperature of 1,200° C. From those, even though considering temperature increase of water, thermal shock comparable to temperature change of from about 250° C./second to 1,300° C./second generated in the reactor 4 can be applied to the carrier.

A. Experimental Conditions

The following four kinds of carriers having different composition were used in the experiment.

Carrier A: The carrier is constituted of the same components as described in the first embodiment, and contains 70% by weight of aluminum in terms of alumina, 10% by weight of barium in terms of BaO, and 20% by weight of YSZ containing 8 mol % of yttria.

Carrier B: The carrier is constituted of the same components as described in the second embodiment, and contains 60% by weight of aluminum in terms of alumina, 20% by weight of calcium in terms of CaO, 10% by weight of silica in terms of $SiO_2$, and 10% by weight of magnesium in terms of MgO.

Carrier C: The carrier is constituted of the same components as described in the third embodiment, and contains 50% by weight of aluminum in terms of alumina, 25% by weight of magnesium in terms of MaO, and 25% by weight of YSZ containing 8 mol % of yttria.

Carriers D, E and F: Those carriers contain 95% by weight or more of aluminum in terms of alumina, and are calcined at high temperature to form α-alumina.

Pore distribution and pore volume of pores of each carrier were measured by a mercury intrusion technique using mercury porosimeter.

Example 1

A barium nitrate aqueous solution was mixed with the commercially available pseudoboehmite powder and YSZ powder containing 8 mol % of yttria ($Y_2O_3$), and the resulting mixture was dried at 110° C. for 3 hours or longer. A solid after drying was crushed, a molding aid was added thereto, and a carrier A which is a tablet-shaped molded article having a diameter of 5 mm and a height of 5 mm was prepared with a tablet molding machine. The carrier A was then calcined at 1,200° C. for hours to prepare a carrier A-1. Pore volume distribution was shown in Table 1, and log differential pore volume distribution curve was shown in FIG. 2 by plotting those values with circles (○) and connecting those with a solid line. The pore volume of the first range is 49.61% of the whole, and the pore volume of the second range is 14.65% of the whole. Furthermore, in the case that the pore distribution of the first range and the pore distribution of the second range are shown by log differential pore volume distribution curve, those ranges are continued. Thus, those results are satisfied with the requirements (i) to (iii). The specific surface area of the carrier was 6.4 $m^2$/g, and the whole pore volume was 0.2 $cm^3$/g.

Example 2

The carrier A was calcined at 1,400° C. for 10 hours to prepare a carrier A-2. Pore volume distribution was shown in Table 1, and log differential pore volume distribution curve was shown in FIG. 2 by plotting those values with circles (○) and connecting those with a broken line. The pore volume of the first range is 66.85% of the whole, and the pore volume of the second range is 24.49% of the whole. Furthermore, in the case that the pore distribution of the first range and the pore distribution of the second range are shown by log differential pore volume distribution curve, those ranges are continued. Thus, those results are satisfied with the requirements (i) to (iii). The specific surface area of the carrier was 4.7 m²/g, and the whole pore volume was 0.2 cm³/g.

Example 3

The carrier A was calcined at 1,500° C. for 10 hours to prepare a carrier A-3. Pore volume distribution was shown in Table 1, and log differential pore volume distribution curve was shown in FIG. 2 by plotting those values with black circles (●). The pore volume of the first range is 78.88% of the whole, and the pore volume of the second range is 18.20% of the whole. Furthermore, in the case that the pore distribution of the first range and the pore distribution of the second range are shown by log differential pore volume distribution curve, those ranges are continued. Thus, those results are satisfied with the requirements (i) to (iii). The specific surface area of the carrier was 1.9 m²/g, and the whole pore volume was 0.17 cm³/g.

Example 4

Similar to Example 1, water was added to the commercially available pseudoboehmite powder, alumina cement, silica sol and magnesium oxide powder, followed by mixing. The resulting mixture was dried and tablet-molded to prepare a carrier B. The carrier B was then calcined at 1,400° C. in the same manner as in Example 1 to prepare a carrier B-1. Pore volume distribution was shown in Table 1, and log differential pore volume distribution curve was shown in FIG. 2 by plotting those values with triangles (△). The pore volume of the first range is 32.31% of the whole, and the pore volume of the second range is 61.66% of the whole. In the case that the pore distribution of the first range and the pore distribution of the second range are shown by log differential pore volume distribution curve, those ranges are continued. Thus, those results are satisfied with the requirements (i) to (iii). The specific surface area of the carrier was 1.1 m²/g, and the whole pore volume was 0.23 cm³/g.

Example 5

Similar to Example 1, water was added to the commercially available pseudoboehmite powder, YSZ powder containing 8 mol % of yttria ($Y_2O_3$) and magnesium oxide powder, followed by mixing. The resulting mixture was dried and tablet-molded to prepare a carrier C. The carrier C was then calcined at 1,400° C. in the same manner as in Example 1 to prepare a carrier C-1. Pore volume distribution was shown in Table 1, and log differential pore volume distribution curve was shown in FIG. 2 by plotting those values with black triangles (▲). The pore volume of the first range is 34.92% of the whole, and the pore volume of the second range is 53.00% of the whole. In the case that the pore distribution of the first range and the pore distribution of the second range are shown by log differential pore volume distribution curve, those ranges are continued. Thus, those results are satisfied with the requirements (i) to (iii). The specific surface area of the carrier was 0.5 m²/g, and the whole pore volume was 0.11 cm³/g.

Example 6

In Example 1, a barium nitrate aqueous solution was mixed with the commercially available pseudoboehmite powder and YSZ powder containing 8 mol % of yttria ($Y_2O_3$), and a binder was added thereto to adjust the amount of water. The resulting mixture was extruded and dried. The resulting molded article was then calcined at 1,500° C. to obtain a carrier A-4 of which is a ring-shaped molded article having an inner diameter of 7 mm, an outer diameter of 17 mm and a height of about 20 mm. Pore volume distribution was shown in Table 1, and log differential pore volume distribution curve was shown in FIG. 2 by plotting those values with squares (□). The pore volume of the first range is 52.02% of the whole, and the pore volume of the second range is 37.97% of the whole. Furthermore, in the case that the pore distribution of the first range and the pore distribution of the second range are shown by log differential pore volume distribution curve, those ranges are continued. Thus, those results are satisfied with the requirements (i) to (iii). The specific surface area of the carrier was 2.4 m²/g, and the whole pore volume was 0.24 cm³/g.

TABLE 1

| Pore diameter D (μm) | Example 1 | | Example 2 | | Example 3 | |
|---|---|---|---|---|---|---|
| | Pore volume (cm³/g) | Volume ratio (%) | Pore volume (cm³/g) | Volume ratio (%) | Pore volume (cm³/g) | Volume ratio (%) |
| 10 ≤ D | 0.015 | 7.37 | 0.0037 | 1.83 | 0.004 | 2.38 |
| 1 ≤ D < 10 | 0.0298 | 14.65 | 0.0495 | 24.49 | 0.0306 | 18.20 |
| 0.1 ≤ D < 1 | 0.1009 | 49.61 | 0.1351 | 66.85 | 0.1326 | 78.88 |
| 0.01 ≤ D < 0.1 | 0.0577 | 28.37 | 0.0132 | 6.53 | 0.0009 | 0.54 |
| D < 0.01 | 0 | 0.00 | 0.0006 | 0.30 | 0 | 0.00 |
| Total | 0.2034 | 100.00 | 0.2021 | 100.00 | 0.1681 | 100.0 |
| Specific surface area (m²/g) | 6.4 | | 4.7 | | 1.9 | |

TABLE 1-continued

| | Example 4 | | Example 5 | | Example 6 | |
|---|---|---|---|---|---|---|
| Pore diameter D (μm) | Pore volume (cm³/g) | Volume ratio (%) | Pore volume (cm³/g) | Volume ratio (%) | Pore volume (cm³/g) | Volume ratio (%) |
| 10 ≦ D | 0.0056 | 2.43 | 0.0038 | 3.35 | 0.0242 | 9.90 |
| 1 ≦ D < 10 | 0.142 | 61.66 | 0.0601 | 53.00 | 0.0927 | 37.97 |
| 0.1 ≦ D < 1 | 0.0744 | 32.31 | 0.0396 | 34.92 | 0.127 | 52.02 |
| 0.01 ≦ D < 0.1 | 0.0067 | 2.91 | 0.0066 | 5.82 | 0.0003 | 0.11 |
| D < 0.01 | 0.0016 | 0.69 | 0.0033 | 2.91 | 0 | 0.00 |
| Total | 0.2303 | 100.00 | 0.1134 | 100.00 | 0.2442 | 100.00 |
| Specific surface area (m²/g) | 1.1 | | 0.5 | | 2.4 | |

Comparative Example 1

Figure 3:
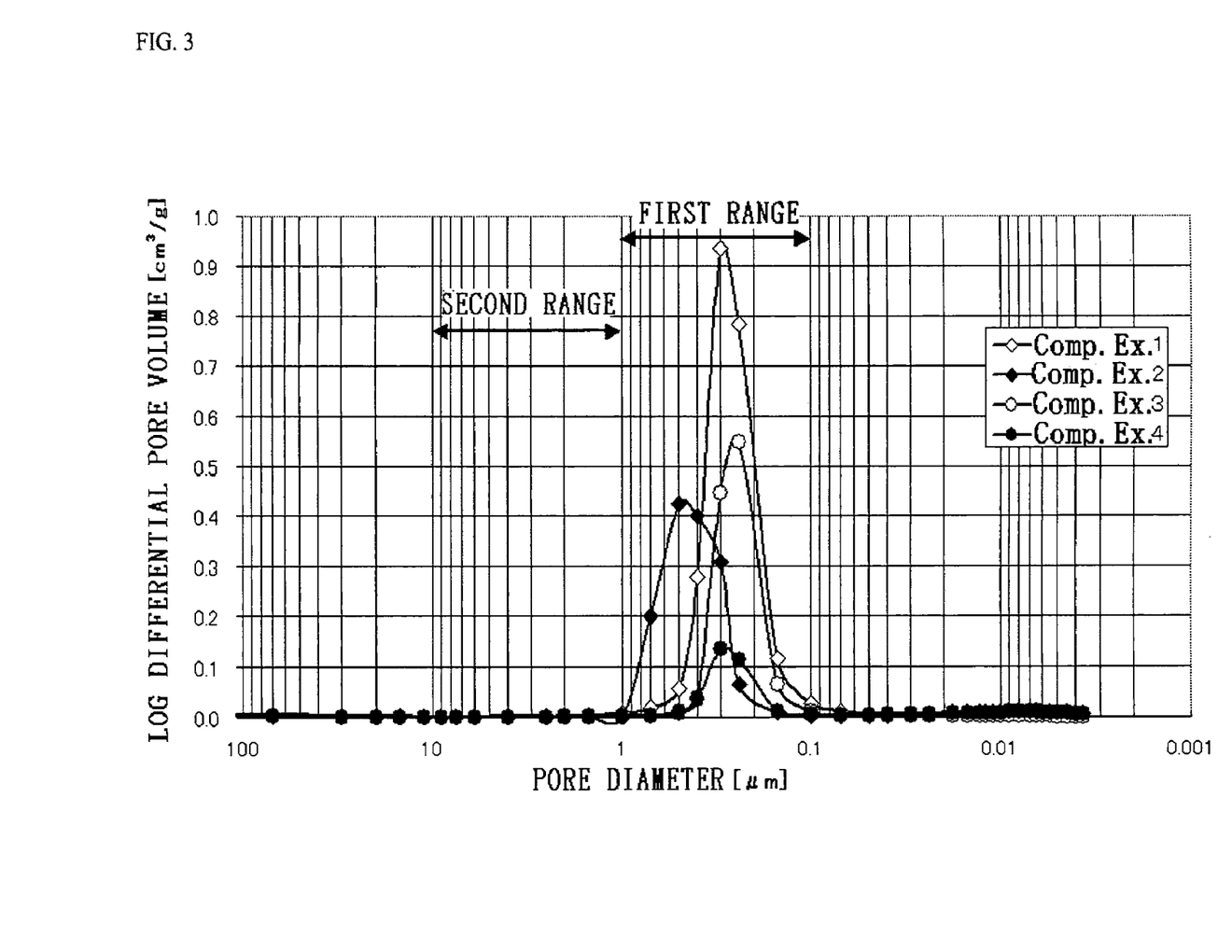
FIG. 3 is an explanatory view showing log differential pore volume distribution curves of the carriers according to the Comparative Examples.

In Example 1, the powder was not tablet-molded, but molded by tumbling granulation method to prepare spheres having a diameter of from 3 mm to 5 mm. The spheres were calcined at 1,300° C. for 10 hours to obtain a carrier A-5. Pore volume distribution was shown in Table 2, and log differential pore volume distribution curve was shown in FIG. 3 by plotting those values with diamond shapes (◇). The pore volume of the first range is 94.84% of the whole, and the pore volume of the second range is 0.99% of the whole. Those results are not satisfied with the requirements (ii) and (iii).

Comparative Example 2

A molding aid was added to the commercially available pseudoboehmite powder, and the resulting mixture was tablet-molded in the same manner as in Example 1 to prepare a tablet-shaped molded article having a diameter of 3 mm and a height of 3 mm, and next it was baked at 1,300 degrees Celsius for ten hours, and a carrier D was obtained. Pore volume distribution was shown in Table 2, and log differential pore volume distribution curve was shown in FIG. 3 by plotting those values with black diamond shapes (◆). The pore volume of the first range is 94.47% of the whole, and the pore volume of the second range is 0.53% of the whole. Thus, those results are not satisfied with the requirements (ii) and (iii).

Comparative Example 3

An alumina carrier (spherical product of 3 to 5 mm), a product of Seto Chip Kogyo K.K., was calcined at 1,300° C. for 10 hours to obtain a carrier E. Pore volume distribution was shown in Table 2, and log differential pore volume distribution curve was shown in FIG. 3 by plotting those values with circles (○). The pore volume of the first range is 95.83% of the whole, and the pore volume of the second range is 0.67% of the whole. Thus, those results are not satisfied with the requirements (ii) and (iii).

Comparative Example 4

The alumina carrier, a product of Seto Chip Kogyo K.K., of Comparative Example 3 was calcined at 1,600° C. for 10 hours to obtain a carrier F. Pore volume distribution was shown in Table 2, and log differential pore volume distribution curve was shown in FIG. 3 by plotting those values with black circles (●). The pore volume of the first range is 75.78% of the whole, and the pore volume of the second range is 2.28% of the whole. Thus, those results are not satisfied with the requirements (ii) and (iii).

TABLE 2

| Pore diameter D (μm) | Pore volume (cm³/g) | Volume ratio (%) | Pore volume (cm³/g) | Volume ratio (%) |
|---|---|---|---|---|
| | Comparative Example 1 | | Comparative Example 2 | |
| 10 ≦ D | 0.0024 | 0.88 | 0.0022 | 1.16 |
| 1 ≦ D < 10 | 0.0027 | 0.99 | 0.001 | 0.53 |
| 0.1 ≦ D < 1 | 0.2591 | 94.84 | 0.1793 | 94.47 |
| 0.01 ≦ D < 0.1 | 0.0061 | 2.23 | 0.0043 | 2.27 |
| D < 0.01 | 0.0029 | 1.06 | 0.003 | 1.58 |
| Total | 0.2732 | 100.00 | 0.1898 | 100.00 |
| | Comparative Example 3 | | Comparative Example 4 | |
| 10 ≦ D | 0.0012 | 0.89 | 0.0013 | 2.69 |
| 1 ≦ D < 10 | 0.0009 | 0.67 | 0.0011 | 2.28 |
| 0.1 ≦ D < 1 | 0.1286 | 95.83 | 0.0366 | 75.78 |
| 0.01 ≦ D < 0.1 | 0.0027 | 2.01 | 0.0056 | 11.59 |
| D < 0.01 | 0.0008 | 0.60 | 0.0037 | 7.66 |
| Total | 0.1342 | 100.00 | 0.0483 | 100.00 |

In Comparative Examples 1 to 4, specific surface area of the carrier was not measured, but it is considered from the general properties of the carrier that the specific surface area is fallen within a range of from 10 m²/g to 0.1 m²/g.

B. Experimental Results

Figure 4:
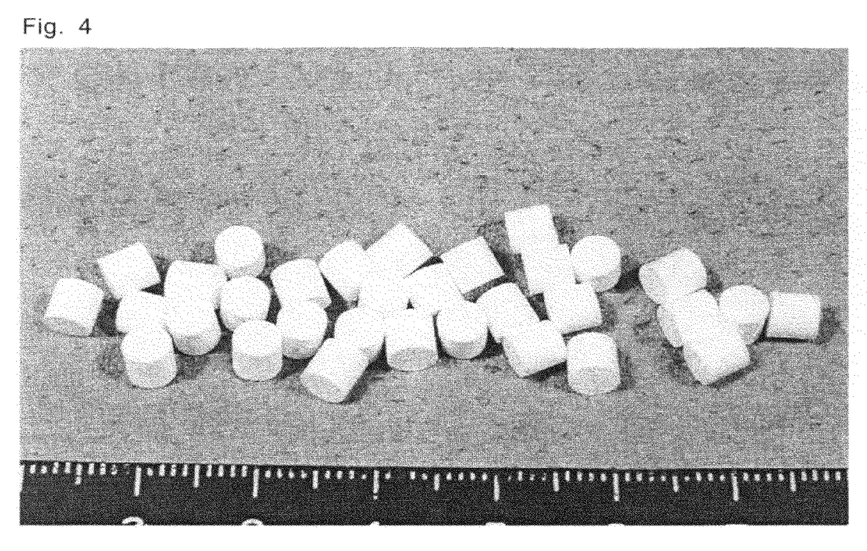
FIG. 4 is an appearance photograph after applying thermal shock to the carriers according to the Examples.
Figure 5:
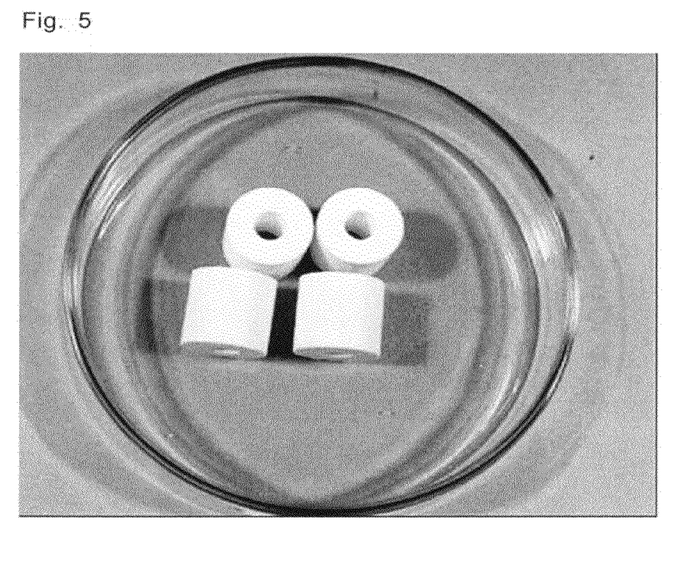
FIG. 5 is an appearance photograph after applying thermal shock to the carriers according to other Examples.
Figure 6:
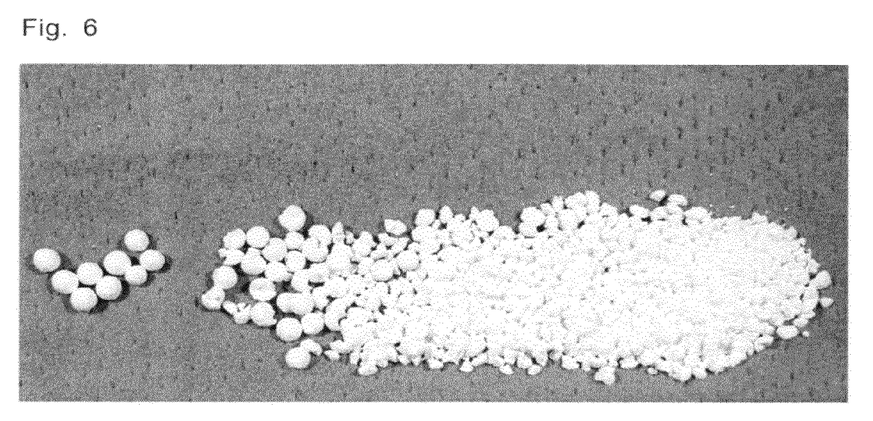
FIG. 6 is an appearance photograph after applying thermal shock to the carriers according to the Comparative Examples.
Figure 7:
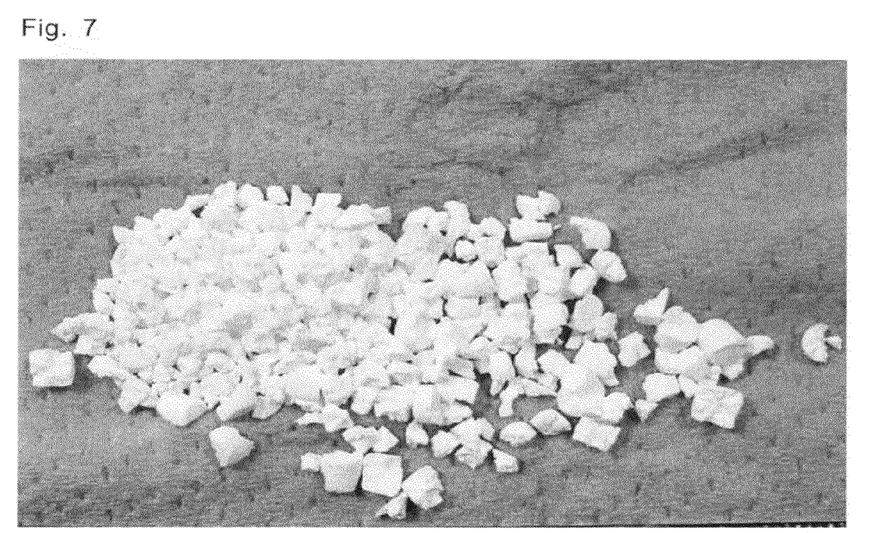
FIG. 7 is an appearance photograph after applying thermal shock to the carriers according to other Comparative Examples.

As the representative experimental results of Examples 1 to 6, appearance photographs after repeating rapid heating by a muffle furnace and rapid cooling by introduction into water 10 times with respect to the carriers according to Example 1 and Example 6 are shown in FIGS. 4 and 5, respectively. As the representative experimental results of Comparative Examples 1 to 4, the appearance photograph as a result of repeating the same thermal shock test three times with respect to Comparative Example 1 is shown in FIG. 6, and the appearance photograph as a result of repeating the same thermal shock test four times with respect to Comparative Example 2 is shown in FIG. 7.

According to the experimental result of Example 1 shown in FIG. 4, destruction and powdering of each molded article were not confirmed in spite of repeatedly receiving rapid cooling of from 1,200° C. to normal temperature and thermal shock due to heating, ten times. The same is applied to the result of Example 6 shown in FIG. 5. Furthermore, in the experimental results of Examples 2 to 5, destruction and powdering of each molded article were not confirmed, similar to FIGS. 4 and 5. Contrary to this, according to the result of Comparative Example 1 shown in FIG. 6, peeling on the surface of the molded article was observed by the second thermal shock in the molded articles molded into a Sphere, and most of the molded articles were destructed and powdered by merely the third thermal shock to an extent that the molded article almost loses its original form. The molded article shown at the left side in FIG. 6 is a molded article remained without destruction by the third thermal shock. Furthermore, even in Comparative Example 2 shown in FIG. 7, the molded articles molded into a tablet shape were all destructed by the fourth thermal shock. Moreover, even in the experimental results of Comparative Examples 3 and 4, each molded article was destructed and powdered, similar to FIGS. 6 and 7.

It could be confirmed from the above experimental results that the molded articles according to Examples 1 to 6 provided with the requirements (i) to (iii) exhibit high thermal shock resistance. Particularly, in the comparison between Examples 1, 2, 3 and, 6, and Comparative Example 1, even though those molded articles use the carrier A comprising the common components, those molded articles are classified into molded articles having high thermal shock resistance and molded articles having low thermal shock resistance depending on the difference in pore distribution. This proves the fact that the requirements (i) to (iii) are factors to increase thermal shock resistance. Furthermore, it says from this result that the thermal shock resistance obtained as a result of having inherent pore distribution pattern of a carrier and a catalyst, and such a pore distribution is greatly influenced by not only a composition, but a molding method, particularly pressure at the time of molding and calcination temperature, selection of a binder, and the like.

The invention claimed is:

1. A catalyst for catalytic partial oxidation of hydrocarbon, which comprises a carrier comprising an inorganic oxide, a first constituent element of the carrier comprising an inorganic oxide being Al, the carrier containing Al in an amount of from 30% to 90% per unit weight in terms of $Al_2O_3$, the carrier comprising an inorganic oxide further comprising oxides of at least two elements selected from the group consisting of elements belonging to alkaline earth metals, elements belonging to rare earth metals, and the elements Sc, Bi, Zr, Si and Ti, in addition to the first constituent element, the carrier comprising the inorganic oxide contains zirconia stabilized by at least one element selected from Y Ce, Ca, Mg, Sc and Sm, the carrier also comprising an active metal supported thereon, the catalyst having pores, wherein,
in a pore distribution of the pores in the catalyst, the total volume of pores having a pore diameter of from 0.1 μm to less than 1.0 μm defining a first range is 32% or more of the whole pore volume, and
the total volume of pores having a pore diameter of from 1.0 μm to less than 10 μm defining a second range is 14% or more of the whole pore volume,
wherein the catalyst is used in producing a synthesis gas containing carbon monoxide and hydrogen by adding at least oxygen and steam to a raw material hydrocarbon containing at least one of methane and a light hydrocarbon having 2 or more carbon atoms, thereby subjecting the raw material hydrocarbon to catalytic partial oxidation.

2. The catalyst for catalytic partial oxidation of hydrocarbon as claimed in claim 1, wherein a specific surface area of the catalyst is from 0.5 $m^2/g$ to 7.0 $m^2/g$.

3. The catalyst for catalytic partial oxidation of hydrocarbon as claimed in claim 1, wherein the whole pore volume of the catalyst is from 0.05 $cm^3/g$ to 0.3 $cm^3/g$.

4. The catalyst for catalytic partial oxidation of hydrocarbon as claimed in claim 1, wherein the elements belonging to the alkaline earth metals are selected from Mg, Ca, Sr and Ba, and the elements belonging to the rare earth metals are selected from Y, La, Ce, Pr, Nd, Sm, Eu, Gd, Tb, Dy, Ho, Er and Yb.

5. The catalyst for catalytic partial oxidation of hydrocarbon as claimed in claim 1, wherein the stabilized zirconia is yttria-stabilized zirconia.

6. The catalyst for catalytic partial oxidation of hydrocarbon as claimed in claim 5, wherein the yttria-stabilized zirconia contains yttria in a range of from 2 mol % to 10 mol %.

7. The catalyst for catalytic partial oxidation of hydrocarbon as claimed in claim 1, wherein the active metal is at least one metal selected from elements of Group VIII of the periodic table.

8. The catalyst for catalytic partial oxidation of hydrocarbon as claimed in claim 7, wherein the elements of Group VIII of the periodic table are Ru, Pt, Rh, Pd, Os and Ir.

9. The catalyst for catalytic partial oxidation of hydrocarbon as claimed in claim 1, wherein the active metal is contained in an amount of from 0.05% to 5.0% by weight per unit weight of the catalyst.

10. A catalyst for catalytic partial oxidation of hydrocarbon, said catalyst comprising a carrier comprising an inorganic oxide and an active metal supported thereon, which is used in producing a synthesis gas containing carbon monoxide and hydrogen by adding at least oxygen and steam to raw material hydrocarbon containing at least one of methane and a light hydrocarbon having two or more carbon atoms, the catalyst having pores, wherein:
in a pore distribution of the pores of the catalyst, the total volume of pores having a pore diameter of from 0.1 μm to less than 1.0 μm defining a first range is 32% or more of the whole pore volume,
the total volume of pores having a pore diameter of from 1.0 μm to less than 10 μm defining a second range is 14% or more of the whole pore volume,
a first constituent element of the carrier comprising an inorganic oxide is Al, the carrier containing Al in an amount from 30% to 90% per unit weight in terms of $Al_2O_3$, and
the carrier comprising an inorganic oxide including, in addition to the first constituent element, zirconia stabilized by one or more elements selected from Y, Ce, Ca, Mg, Sc, and Sm.

11. The catalyst for catalytic partial oxidation of hydrocarbon as claimed in claim 10, wherein the stabilized zirconia is yttria-stabilized zirconia.

12. The catalyst for catalytic partial oxidation of hydrocarbon as claimed in claim 11, wherein the yttria-stabilized zirconia includes yttria in a range of 2 mol % to 10 mol %.

13. A catalyst for catalytic partial oxidation of hydrocarbon, said catalyst comprising a carrier comprising an inorganic oxide and an active metal supported thereon, which is used in producing a synthesis gas containing carbon monoxide and hydrogen by adding at least oxygen and steam to raw material hydrocarbon containing at least one of methane and a light hydrocarbon having two or more carbon atoms, the catalyst having pores, wherein:
in a pore distribution of the pores of the catalyst, the total volume of pores having a pore diameter of from 0.1 μm to less than 1.0 μm defining a first range is 32% or more of the whole pore volume, the total volume of pores having a pore diameter of from 1.0 μm to less than 10 μm defining a second range is 14% or more of the whole pore volume, a first constituent element of the carrier comprising an inorganic oxide is Al, the carrier containing Al in an amount from 30% to 90% per unit weight in terms of $Al_2O_3$, the carrier further comprises inorganic oxides of at least two elements selected from the group consisting of elements belonging to alkaline earth metals, elements belonging to rare earth metals, and the elements Sc, Bi, Zr, Si and Ti, wherein one of the inorganic oxides of the at least two elements is zirconia stabilized by at least one element selected from Y, Ce, Ca, Mg, Sc and Sm.

* * * * *